United States Patent [19]

Wheeler et al.

[11] Patent Number: 4,709,124
[45] Date of Patent: Nov. 24, 1987

[54] WATERTIGHT ELECTRICAL CONNECTOR

[75] Inventors: Charles F. Wheeler, Olathe; Darryl M. Nielsen, Lenexa, both of Kans.

[73] Assignee: The Marley-Wylain Company, Mission Woods, Kans.

[21] Appl. No.: 778,128

[22] Filed: Sep. 19, 1985

[51] Int. Cl.⁴ .............................................. H02G 3/18
[52] U.S. Cl. .................................... 174/65 R; 310/71
[58] Field of Search ............. 174/65 R, 65 G, 152 R, 174/152 G; 310/71, 87; 339/94 R, 94 A, 94 M, 126 R, 126 RS; 277/190, 186, 181, 188 R, 198

[56] References Cited

U.S. PATENT DOCUMENTS 3,072,415  1/1963  Lombard et al. ................. 339/94 R Primary Examiner—Arthur T. Grimley
Attorney, Agent, or Firm—Schmidt, Johnson, Hovey & Williams

[57] ABSTRACT

A connector for an immersible electric device such as a pump motor substantially precludes water leakage in an area where the wires enter a motor housing. The connector is comprised of a elastomeric body portion having a relatively non-resilient plate secured thereto, and passageways extending through the body portion and the plate complementally receive the electrical wires. The body portion and the plate are installed in a mating bore of the motor base such that the plate is seated against an inwardly extending shoulder within the bore. The connector also includes a steel bracket adjacent the body portion and remote from the plate, and the bracket has barbed arms which are received in smooth walled slots in the base, thereby enabling the arms to be shifted to a position wherein the bracket, in combination with the plate and the bore walls, exert a compressive force on the resilient body portion to force the latter into sealing engagement with not only the bore walls but also into fluid-tight relationship with the outer surfaces of the electrical wires. In preferred forms, the body portion has outwardly extending projections surrounding the wires, and the bracket has openings complemental to the projections such that the walls defining the bracket openings compress the projections against adjacent portions of the wires to create a secondary seal.

8 Claims, 5 Drawing Figures

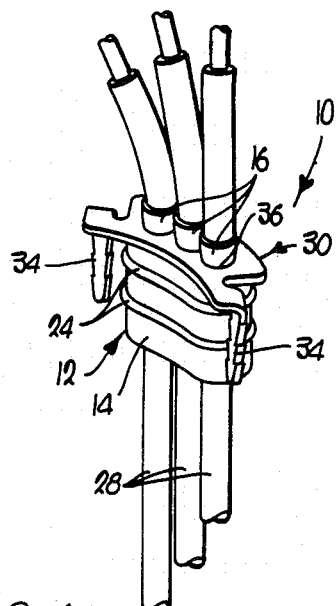
Fig. 1
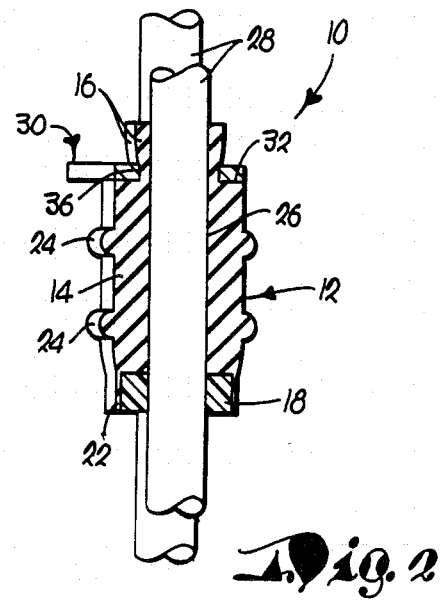
Fig. 2
Fig. 3
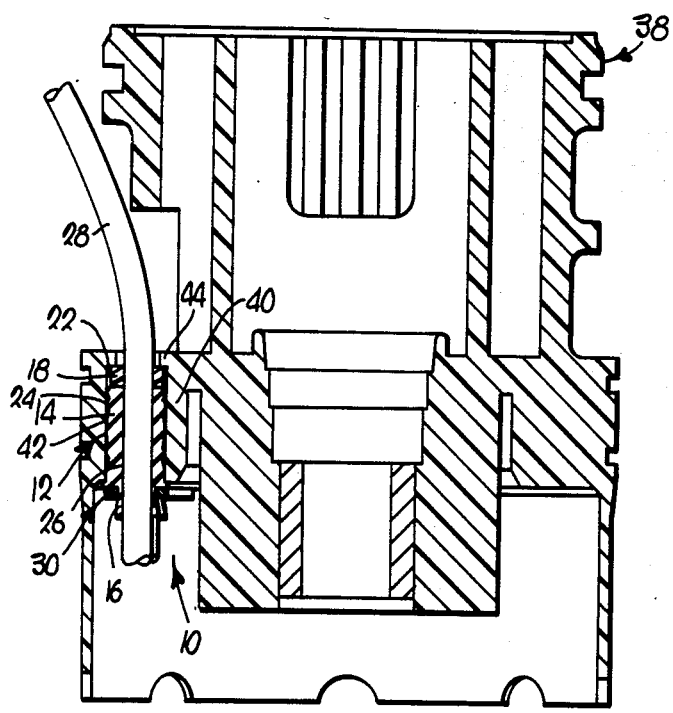
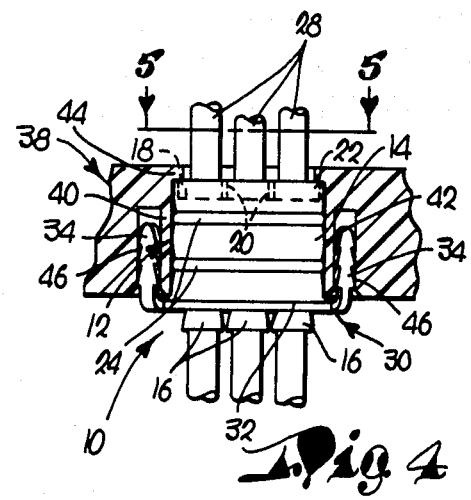
Fig. 4
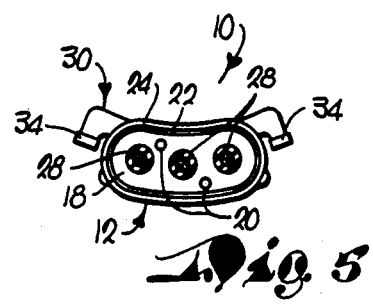
Fig. 5

WATERTIGHT ELECTRICAL CONNECTOR

BACKGROUND OF THE INVENTION

1. Field of the Invention

This invention relates to an electrical connector for use in submersible assemblies such as a pump motor. The connector has a elastomeric body portion which sealingly engages electrical wires as well as bore walls of a motor base so that the entry of water into internal portions of the motor is substantially precluded.

2. Description of the Prior Art

Electrical motors that are immersed in a fluid during use, such as a motor for a deep well submersible pump, typically are connected to a source of electrical power by a set of wires which also are in contact with water. In some instances, the wires terminate in a plug which is inserted into a mating receptacle in the pump housing, and a water-resistant canopy or shell is secured to the wires and engages the receptacle in sealed, fluidtight relationship. In other instances, the wires extend through the motor housing for direct connection to the windings, such that the expense of the plug and receptacle is thereby saved.

Accordingly, motors which are directly connected to wires extending through the motor housing must be provided with a sealable grommet or connector for precluding the entry of water into internal portions of the motor. As can be appreciated, these connectors must satisfactorily preclude leakage over extended periods of use for considerations of safety as well as continued operation of the motor. Moreover, such connectors are subject to motor vibration as well as water pressure, the latter of which can be significant in relatively deep wells.

Certain prior art, immersible electrical devices are provided with wires which are inserted into passages in the device housing, and a sealing compound is applied in an attempt to fill the gaps between the wires and the passage walls. Another type of connector assembly is shown in U.S. Pat. No. 4,161,156 to Sato, et al., issued July 17, 1979, wherein wires are extended through a rubber grommet adjacent a threaded projection of the housing, and a cap is threaded onto the projection for compressing the grommet toward sealing enagement with the wires as well as the housing. Unfortunately, installation of such connectors is somewhat labor intensive and must be performed with consistent, cautious care in order to insure that the resultant assembly is completely resistant to the entry of water during use.

SUMMARY OF THE INVENTION

The instant invention overcomes the abovenoted disadvantages of the prior art by provision of an electrical connector that can be readily installed with a minimum of time and effort. Advantageously, the connector is a single assembly which may be readily snapped into disposition in a bore of a device housing without the use of separate threaded caps, nut or bolts.

In more detail, the connector comprises a curved, oblong member having an elastomeric, relatively resilient body portion disposed in a complemental bore of a motor base. A relatively non-resilient, synthetic resinous end plate is molded to the resilient body portion and engages a shoulder within the bore of the base. A set of wires extends through a passageway in the body portion and the plate. Additionally, a steel bracket is positioned adjacent the body portion remote from the plate and is operable to compress the body portion against the plate and thereby urge the portion outwardly into fluid-tight engagement with the walls of the bore as well as into sealing contact with the wires.

In preferred forms, the steel bracket has a pair of outwardly extending, barbed engagement arms that are engageable with slotted walls within the base. During installation, the arms are pressed into the slots until the bracket exerts a sufficient amount of compressive force on the resilient body portion. Thus, the barbs, in cooperation with the slots, enable the installer to move the barbed arms progressively into the slots until the proper compressive force is produced.

Optionally, the member has a relatively resilient projection extending outwardly from the body portion, and the passageway in the body portion continues through the projection for complemental reception of the electrical wire. The bracket is provided with an opening complemental to the configuration of the projection such that the walls defining the bracket opening compress the projection and thereby urge the same toward a position of sealing engagement with the electrical wire. The projections, in cooperation with the bracket openings, thus provide a secondary seal in addition to the seal presented by the elastomeric body portion against the outer surfaces of the wire, such that the likelihood of leakage is substantially reduced.

Advantageously, the bracket as well as the synthetic resinous plate are complemental in configuration to the body portion such that the latter is substantially enclosed by the bore walls, the plate and the bracket. As a result, there is little likelihood that the elastomeric body portion will slowly deform or creep under the constant compressive stresses exerted by the bracket, the plate and the bore walls.

BRIEF DESCRIPTION OF THE DRAWINGS

FIG. 1 is a perspective view of the connector of the instant invention along with a set of conventional electrical wires extending therethrough;

FIG. 2 is an enlarged, side sectional view of the connector and wires shown in FIG. 1;

FIG. 3 is a side cross-sectional illustration of the connector and wires shown in FIG. 1 as installed on a motor base of a submersible pump;

FIG. 4 is a fragmentary, front elevational view of the connector, wires and a portion of the base as depicted in FIG. 3; and FIG. 5 is a view taken along line 5—5 of FIG. 4 with the base removed for clarity.

DETAILED DESCRIPTION OF THE DRAWINGS

The electrical connector 10, as shown in FIGS. 1-5, is comprised of a somewhat curved, oblong member 12 having a body portion 14 and three projections 16 extending outwardly from the body portion 14. The member 12 is relatively resilient and is preferably comprised of neoprene having a durometer hardness of 65 to 70.

Referring to FIGS. 2-3, the member 12 also includes a relatively non-resilient element or plate 18 preferably comprised of polyethylene terephalate that contains 45% by weight of polyester fibers. During manufacture, a pair of small holes 20 in the plate 18 (see FIG. 5) enable a quantity of neoprene to flow from the body portion 14 in order to interlock the latter with the plate 18.

As best seen in FIG. 2, the body portion 14 includes a peripheral flange 22 which surrounds the edges of the plate 18. The body portion 14 also includes a pair of spaced ribs 24, 24 disposed in parallel relationship to the flat plate 18.

The member 12 has three parallel passageways 26, each of which extend axially through one of the projections 16 as well as through the body portion 14 and the plate 18. The diameter of the passageways 26 is complemental in configuration to an elongated, electrical lead means or wire 28 disposed in each of the passageways 26. Desirably, each of the wires 28 is of a diameter slightly larger than a major portion of the respective passageway 26 through the body portion 14; as an example, the outer diameter of the wire 28 can be 0.203 inch, while the passageway 26 through the body portion 14 can be generally 0.155 inch.

Furthermore, the connector 10 includes a brace or steel bracket 30 which engages a shoulder 32 presented by the body portions 14 adjacent an inner end of the projections 16. The bracket 30 is complemental in configuration to the body portion 14, for purposes which will be explained hereinafter. The bracket 30 has a pair of outwardly extending, parallel, barbed arms 34, 34 which have a longitudinal axis generally perpendicular to the remaining flat areas of the bracket 30.

Each of the projections 16 extends through a respective opening 36 in the bracket 30. The openings 36 are complemental in configuration to the outer surfaces of the projections 16 and preferably and slightly smaller than the same; as an example, the projections 16 may have a frustoconical shape with an outer diameter of 0.25 inch adjacent the shoulder 32 and an inner diameter of 0.155 inch adjacent the shoulder 32, while the diameter of the openings 36 is 0.25 inch and the outer diameter of the wire 28 is 0.203 inch so that the wire 28 expands the base of the projections 16 to compressively engage the walls defining the openings 36.

An immersible support, such as a motor base 38 for an electrical pump, has walls 40 defining a bore 42 complemental in configuration to the body portion 14 in a direction transverse to the longitudinal axis of the passageways 26. The bore 42 is reduced in cross-sectional area of an uppermost portion to present a continuous shoulder 44 complementally engaging the plate 18. The base 38 also has a pair of slots 46, 46 disposed on opposite sides of the bore 42 (see FIG. 4).

The transverse configuration of the elongated slots 46, 46 is complemental in configuration to the barbed arms 34, 34 but is somewhat smaller than the latter, in order that the barbs can grippingly engage the walls defining the slots 46, 46. Thus, in contrast to prior art barbed fasteners which are engageable with shoulders or grooves, the provision of the arms 34 in cooperation with smooth walled slots 46 of the instant invention enables the barbed arms 34, 34 to grippingly engage the walls defining the slots 46, 46 in any location along the length of the latter.

Once the member 12 is installed within the bore 42 and the arms 34, 34 are simultaneously inserted within the slots 46, 46, the plate 18 is thereby secured to the base 38 by means of the shoulder 44. As a result, continued insertion of the arms 34, 34 into the slots 46, 46 enables the bracket 30 to cooperate with the plate 18 and the base 38 to exert a compressive force on the body portion 14 and thereby urge the latter in a direction transverse to the passageway 26 toward a position of sealing engagement with the bore walls 40. At the same time, the compression of the body portion 14 forces the latter into fluid-tight relationship with the outer surfaces of the wires 28.

Moreover, the plate 18, the bore walls 40 and the bracket 30 cooperate to substantially enclose the body portion 14 in order to substantially preclude creep of the elastomeric portion 14 as would otherwise occur due to the compressive forces exerted on the body portion 14 over an extended length of time. Additionally, only a small portion of the upper surface of the plate 18 is exposed to water contacting the external areas of the base 38 so that the effects of corrosion and the like, as well as potential mechanical interference, are substantially eliminated.

The configuration of the openings 36 on the bracket 30, in combination with the shape of the projections 16, enables the bracket 30 to also exert a compressive force directed radially inwardly toward the axis of each of the projections 16. Thus, the openings 36 thereby urge respective projections 16 toward a position of sealing engagement with an adjacent portion of the wire 28 in order to provide a secondary seal in the vicinity of the projections 16 in addition to the primary seal exerted by the body portion 14 against a respective adjacent portions of the wires 28. Such a dual seal insures that the connector 10 can satisfactorily resist the entry of water between the wires 28 and respective passageways 26, even when a relatively high pressure is encountered in deep wells.

Thus, the connector 10 of the instant invention comprises a single assembly which may be easily handled without the use of separate nuts, caps or other coupling devices. Provision of the barbed arms 34 enables the connector 10 to be readily installed in a minimum of time into a position of sealing, fluid-tight relationship with the base 38.

We claim:
1. In combination:
a support having walls defining a bore;
a member having a relatively resilient body portion disposed in said bore,
said body portion being complemental to said bore walls,
said body portion having an elongated passageway therethrough,
said member including a relatively non-resilient element coupled to said support;
an elongated electrical wire having a transverse configuration complemental to the transverse configuration of said passageway, said wires extending through said passageway; and
a brace connected to said support remote from said element,
said body portion being disposed between said element and said brace,
said brace, said element and said support being cooperable to exert a compressive force on said body portion and thereby urge said body portion toward a position of sealing engagement with said bore walls as well as with said electrical wire,
said brace having means operable to selectively vary the amount of said compressive force,
said means comprising an outwardly extending barbed arm engageable with said support.
2. The invention of claim 3, wherein said support has a shoulder and said element comprises a plate engageable with said shoulder.

3. The invention of claim 2, wherein said plate has an aperture complemental to said passageway for reception of said wire therethrough.

4. The invention of claim 3, wherein said plate is complemental in configuration to said body portion for resisting creep of said body portion.

5. In combination:
a support having walls defining a bore;
a member having a relatively resilient body portion disposed in said bore,
said body portion being complemental to said bore walls,
said body portion having an elongated passageway therethrough,
said member including a relatively non-resilient element coupled to said support;
an elongated electrical wire having a transverse configuration complemental to the transverse configuration of said passageway, said wire extending through said passageway; and
a brace connected to said support remote from said element,
said body portion being disposed between said element and said brace,
said brace, said element and said support being cooperable to exert a compressive force on said body portion and thereby urge said body portion toward a position of sealing engagement with said bore walls as well as with said electrical wire,
said body portion having a peripheral rib disposed transversely to said passageway.

6. In combination:
a support having walls defining a bore;
a member having a relatively resilient body portion disposed in said bore,
said body portion being complemental to said bore walls,
said body portion having an elongated passageway therethrough,
said member including a relatively non-resilient element coupld to said support;
an elongated electrical wire having a transverse configuration complemental to the transverse configuration of said passageway, said wire extending through said passageway; and
a brace connected to said support remote from said element,
said body portion being disposed between said element and said brace,
said brace, said element and said support being cooperable to exert a compressive force on said body portion and thereby urge said body portion toward a position of sealing engagement with said bore walls as well as with said electrical wire,
said body portion having an outwardly extending projection surrounding a portion of said wire,
said brace having an opening complemental to said projection,
said opening being of a configuration to compress said projection into sealing engagement with said wire.

7. A water-resistant electrical connector comprising:
a member having a relatively resilient body portion and a relatively resilient projection extending outwardly from said body portion,
said member having walls defining a passageway extending through said projection and said body portion,
said walls being configured for complemental reception of an electrical lead means through said passageway,
said member presenting a shoulder between said body portion and said projection; and
a brace engaging said shoulder and having means adapted for connection to a support,
said brace having an opening complemental to the configuration of said projection such that said brace compresses said projection and thereby urges said projection toward a position of sealing engagement with said electrical lead means,
said means adapted for connecting said brace to a support comprising an outwardly extending barbed arm.

8. The invention of claim 7, wherein said brace is operable to exert a compressive force on said body portion.

* * * * *